United States Patent
Kawano et al.

(10) Patent No.: US 12,231,009 B2
(45) Date of Patent: Feb. 18, 2025

(54) METHOD FOR MANUFACTURING STATOR OF ROTATING ELECTRIC MACHINE, STATOR OF ROTATING ELECTRIC MACHINE, AND ROTATING ELECTRIC MACHINE

(71) Applicant: Hitachi Astemo, Ltd., Hitachinaka (JP)

(72) Inventors: Yukiko Kawano, Ibaraki (JP); Hiroshi Horie, Ibaraki (JP); Hiroshi Hamano, Ibaraki (JP); Hideaki Noto, Ibaraki (JP); Shunsuke Isogai, Ibaraki (JP); Chihiro Oinuma, Ibaraki (JP); Hirona Tanaka, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 254 days.

(21) Appl. No.: 17/798,777

(22) PCT Filed: Jan. 15, 2021

(86) PCT No.: PCT/JP2021/001187
§ 371 (c)(1),
(2) Date: Aug. 10, 2022

(87) PCT Pub. No.: WO2021/192531
PCT Pub. Date: Sep. 30, 2021

(65) Prior Publication Data
US 2023/0109194 A1    Apr. 6, 2023

(30) Foreign Application Priority Data

Mar. 25, 2020   (JP) .................................. 2020-055135

(51) Int. Cl.
*H02K 15/12*   (2006.01)
*H02K 1/16*    (2006.01)
(Continued)

(52) U.S. Cl.
CPC ............... *H02K 15/12* (2013.01); *H02K 1/16* (2013.01); *H02K 3/30* (2013.01); *H02K 3/345* (2013.01)

(58) Field of Classification Search
CPC ............ H02K 15/12; H02K 1/16; H02K 3/30; H02K 3/345; H02K 3/50; Y02T 10/64
See application file for complete search history.

(56) References Cited

U.S. PATENT DOCUMENTS

2006/0165879 A1   7/2006  Kimura et al.
2016/0172919 A1*  6/2016  Hattori ..................... H02K 3/48
                                                          29/596

FOREIGN PATENT DOCUMENTS

JP     2008-109732 A     5/2008
JP     2010-178554 A     8/2010
(Continued)

OTHER PUBLICATIONS

International Search Report with English Translation and Written Opinion issued in corresponding application No. PCT/JP2021/001187, dated Apr. 27, 2021.

*Primary Examiner* — Thomas Truong
(74) *Attorney, Agent, or Firm* — Foley & Lardner LLP

(57) ABSTRACT

To prevent varnish from adhering to an adhesion prohibited area while satisfying required performance for varnish. A method for manufacturing a stator of a rotating electric machine in which a coil is wound around a stator core, the method includes: a first varnish process of forming a first varnish portion by dropping varnish at a coil disposed on an outermost circumference or an innermost circumference of a coil end portion where the coil protrudes from the stator core and positioned close to the stator core; and a second varnish process of forming a second varnish portion to provide a non-existence region where varnish is not applied between the first varnish portion and the second varnish (Continued)

portion by dropping varnish at a position farther from the stator core than a position in the first varnish process.

16 Claims, 4 Drawing Sheets

(51) Int. Cl.
    *H02K 3/30*     (2006.01)
    *H02K 3/34*     (2006.01)

(56) References Cited

FOREIGN PATENT DOCUMENTS

| | | | |
|---|---|---|---|
| JP | 2016-116260 A | | 6/2016 |
| JP | 2020010558 A | * | 1/2020 |
| WO | WO-2005/027320 A1 | | 3/2005 |

* cited by examiner

METHOD FOR MANUFACTURING STATOR OF ROTATING ELECTRIC MACHINE, STATOR OF ROTATING ELECTRIC MACHINE, AND ROTATING ELECTRIC MACHINE

TECHNICAL FIELD

The present invention relates to a method for manufacturing a stator of a rotating electric machine.

BACKGROUND ART

There is a stator in which a coil is housed in a slot formed in a circumferential direction. The coil accommodated in the slot is fixed by varnish.

A background art of the present technical field includes JP 2008-109732 A (PTL 1). JP 2008-109732 A discloses a varnish treatment method for impregnating a coil attached to a stator core with varnish including: a first supply process in which, a stator core is held horizontally under such a posture as the coil end of a coil attached to the stator core becomes vertical, varnish is injected from the upper surface of the upper coil end projecting from the upper end face of the stator core in the coil, and then the varnish is supplied while a supply is controlled such that the impregnation varnish flowing from the upper portion to the lower portion of the upper coil end is gelated before reaching the outside of the lower coil end projecting from the lower end face of the stator core in the coil; an inversion process in which the stator core to which the coil is attached is inverted at a time interval not shorter than the gelation time of the varnish supplied finally in the first supply process; and a second supply process in which following the inversion process, varnish is supplied while a supply is controlled such that the gelation begins after the varnish is impregnated up to the vicinity of the gelation starting position in the first supply process (see, for example, claim 1).

CITATION LIST

Patent Literature

PTL 1: JP 2008-109732 A

SUMMARY OF INVENTION

Technical Problem

In such a rotating electric machine, there is a problem that the varnish applied to the coil adheres to an adhesion prohibited area of the stator and the product becomes defective in the manufacturing process of the stator. On the other hand, when the amount of the varnish is reduced so as not to adhere to the adhesion prohibited area, the fixing force for fixing the coil and the insulating paper by the varnish and fixing the insulating paper and the core by the varnish is reduced, so that there is a risk that the coil and the insulating paper are damaged by vibration during the rotation of the motor, and the insulation is reduced, thereby causing damage and ignition of the motor.

For this reason, there is a demand for a method for manufacturing a stator that satisfies the required quality of a product in which the varnish does not adhere to the adhesion prohibited area while satisfying the required performance for the varnish with a sufficient amount of varnish being injected into a slot.

Solution to Problem

A representative example of the invention disclosed in the present application is as follows. That is, a method for manufacturing a stator of a rotating electric machine in which a coil is wound around a stator core, the method includes: a first varnish process of forming a first varnish portion by dropping varnish at a coil disposed on an outermost circumference or an innermost circumference of a coil end portion where the coil protrudes from the stator core and positioned close to the stator core; and a second varnish process of forming a second varnish portion to provide a non-existence region where varnish is not applied between the first varnish portion and the second varnish portion by dropping varnish at a position farther from the stator core than a position in the first varnish process.

Advantageous Effects of Invention

According to the present invention, it is possible to prevent varnish from adhering to an adhesion prohibited area. Problems, configurations, and effects other than those described above will be made clear by the description of the following embodiments.

DESCRIPTION OF EMBODIMENTS

[Rotating Electric Machine]

First, an outline of a rotating electric machine of the present embodiment will be described. The rotating electric machine of the present embodiment is a rotating electric machine suitable for use in traveling of an automobile because a rectangular wire capable of reducing the size and increasing the output is used. Examples of automobile using a rotating electric machine include a hybrid type electric vehicle (HEV) including both an engine and a rotating electric machine, and an electric vehicle (EV) that travels only with a rotating electric machine without using an engine. However, the rotating electric machine described below can be applied to any type. A rotating electric machine used for a hybrid type automobile will be described below as an example.

Figure 1:
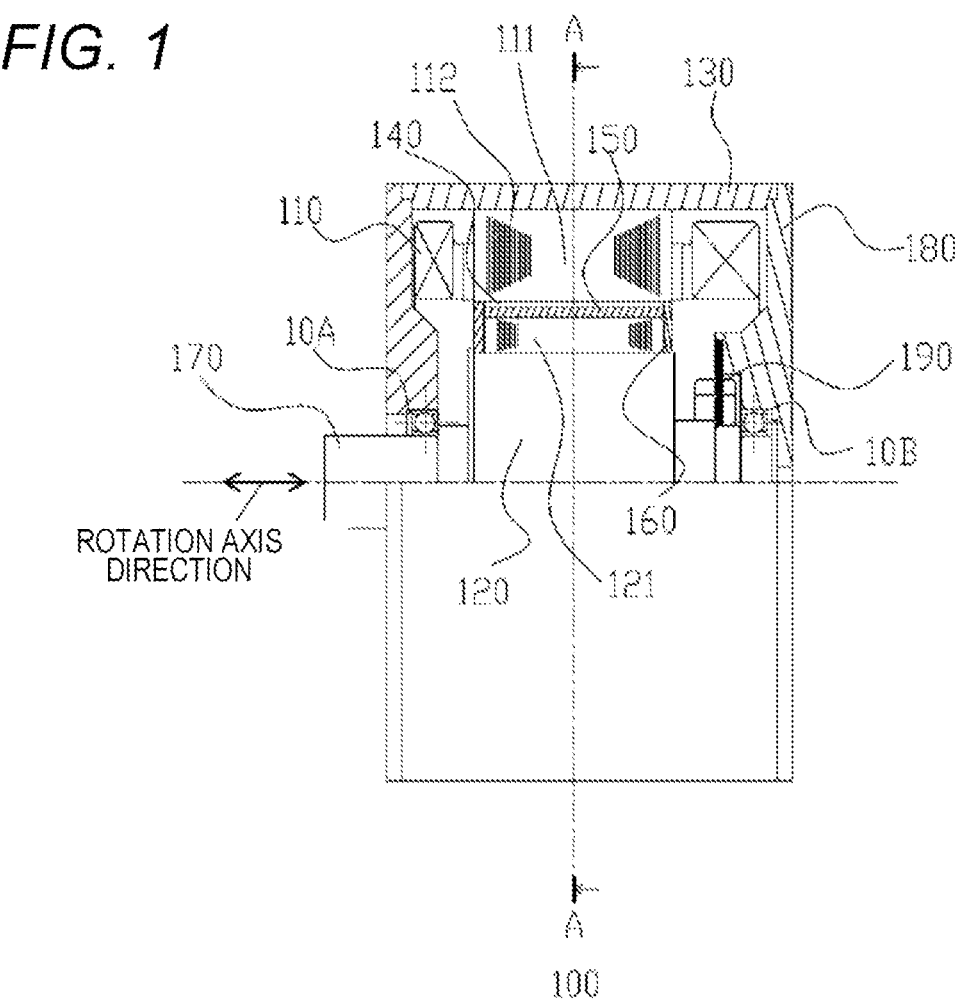
FIG. 1 is a cross-sectional view of a rotating electric machine of an embodiment.

FIG. 1 is a cross-sectional view of a rotating electric machine 100 according to an embodiment of the present invention. This rotating electric machine 100 is a three-phase electric motor with a built-in permanent magnet. In the rotating electric machine 100, a stator coil 110 is wound around a stator core 111, and when a three-phase alternating current is supplied to the stator coil 110, a rotor 120 operates as an electric motor that rotates. When the rotating electric machine 100 is driven by the engine, the rotating electric machine operates as a generator that generates three-phase alternating current. That is, the above function can be selectively used depending on the traveling state of the automobile.

As illustrated in FIG. 1, the rotating electric machine 100 includes a housing 130 and a stator 112 fixed to the housing 130. As described above, the stator 112 includes the stator coil 110 and the stator core 111. The rotor 120 is rotatably disposed inside the stator core 111 via a void 140. The rotor 120 includes a rotor core 121, a permanent magnet 150, and a non-magnetic abutting plate 160. The rotor core 121 is fixed to a cylindrical shaft 170. In the following description, a shaft center direction of the shaft 170 is referred to as "axial direction", a direction rotating about the shaft center is referred to as "circumferential direction", and a radial direction about the shaft center is referred to as "radial direction".

The housing 130 has an end bracket 180 provided with bearings 10A and 10B, and the shaft 170 is rotatably held by these bearings 10A and 10B. The shaft 170 is provided with a resolver 190 that detects a position of a pole and a rotation speed of the rotor 120.

Figure 2:
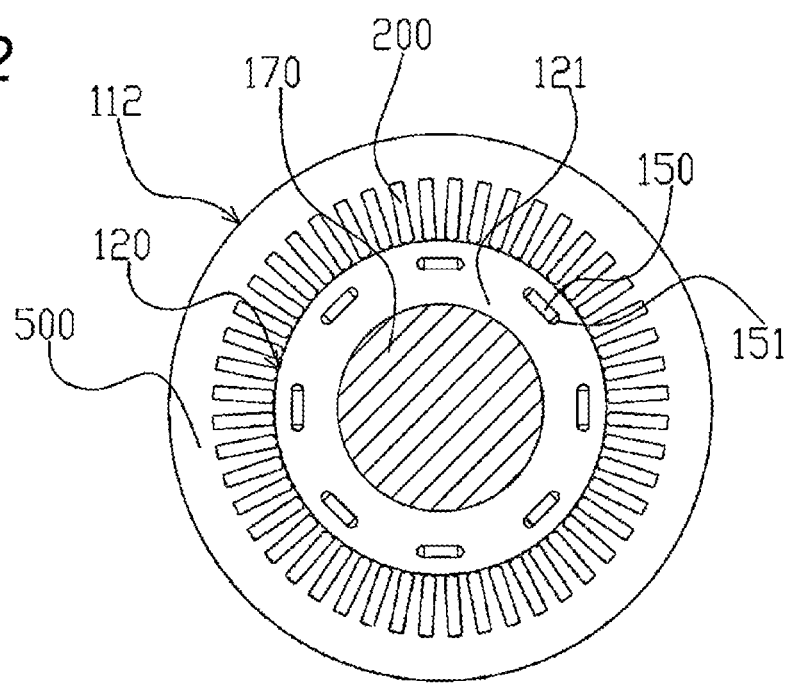
FIG. 2 is a cross-sectional view of the rotating electric machine illustrated in FIG. 1, taken along line A-A.

FIG. 2 is a cross-sectional view of the rotating electric machine 100 illustrated in FIG. 1, taken along line A-A. In FIG. 2, the housing 130 and the stator coil 110 are not illustrated. In the stator core 111, a plurality of slots 200 extending in the axial direction is arranged at equal intervals in the circumferential direction. The number of slots 200 is 48 in the present embodiment, for example. The stator coil 110 is accommodated in the slot 200.

Although not illustrated, an insulating paper (so-called slot liner) is disposed in each slot 200. Disposed between the stator coils 110 inserted into the slot 200 and between the stator coil 110 and the inner surface of the slot 200, the insulating paper improves the dielectric strength voltage between the stator coils 110 and between the stator coil 110 and the inner surface of the slot 200. The insulating paper is, for example, an insulating sheet of heat-resistant polyamide paper, and has a thickness of about 0.1 to 0.5 mm.

In the rotor core 121, rectangular parallelepiped magnet insertion holes are arranged at equal intervals in the circumferential direction in the vicinity of the outer peripheral part. A permanent magnet 150 is embedded in each magnet insertion hole, and fixed with an adhesive or the like. The width of the magnet insertion hole in the circumferential direction is formed to be larger than the width of the permanent magnet 150 in the circumferential direction, the magnetic voids 151 are formed on both sides of the permanent magnet 150. This magnetic void 151 may be filled with an adhesive or may be fixed integrally with the permanent magnet 150 with a resin.

The magnetization direction of the permanent magnet 150 is oriented in the radial direction, and the orientation of the magnetization direction is reversed for each field pole. That is, if the surface on the stator side of the permanent magnet 150 for forming a certain magnetic pole is the N pole and the surface on the shaft side is the S pole, the surface on the stator side of the permanent magnet 150 forming the adjacent magnetic pole is the S pole, and the surface on the shaft side is the N pole. In the present embodiment, eight permanent magnets 150 are magnetized and arranged so that the magnetization direction is alternately changed for each magnetic pole at equal intervals in the circumferential direction, and the rotor 120 forms eight poles.

Note that the permanent magnet 150 may be embedded in the magnet insertion hole of the rotor core 121 after being magnetized, or may be inserted into the magnet insertion hole of the rotor core 121 before magnetized, and then magnetized by applying a strong magnetic field.

However, the permanent magnet 150 after magnetized has a strong magnetic force, and when the magnet is magnetized before the permanent magnet 150 is fixed to the stator 112, a strong attractive force is generated between the permanent magnet 150 and the rotor core 121 at the time of fixing the permanent magnet 150, and this attractive force hinders the work. There is a concern that dust such as iron powder adheres to the permanent magnet 150 due to strong attractive force. Therefore, it is desirable to magnetize the permanent magnet 150 after being inserted into the magnet insertion hole of the rotor core 121, in order to improve the productivity of the rotating electric machine 100.

[Stator of Rotating Electric Machine]

Figure 3:
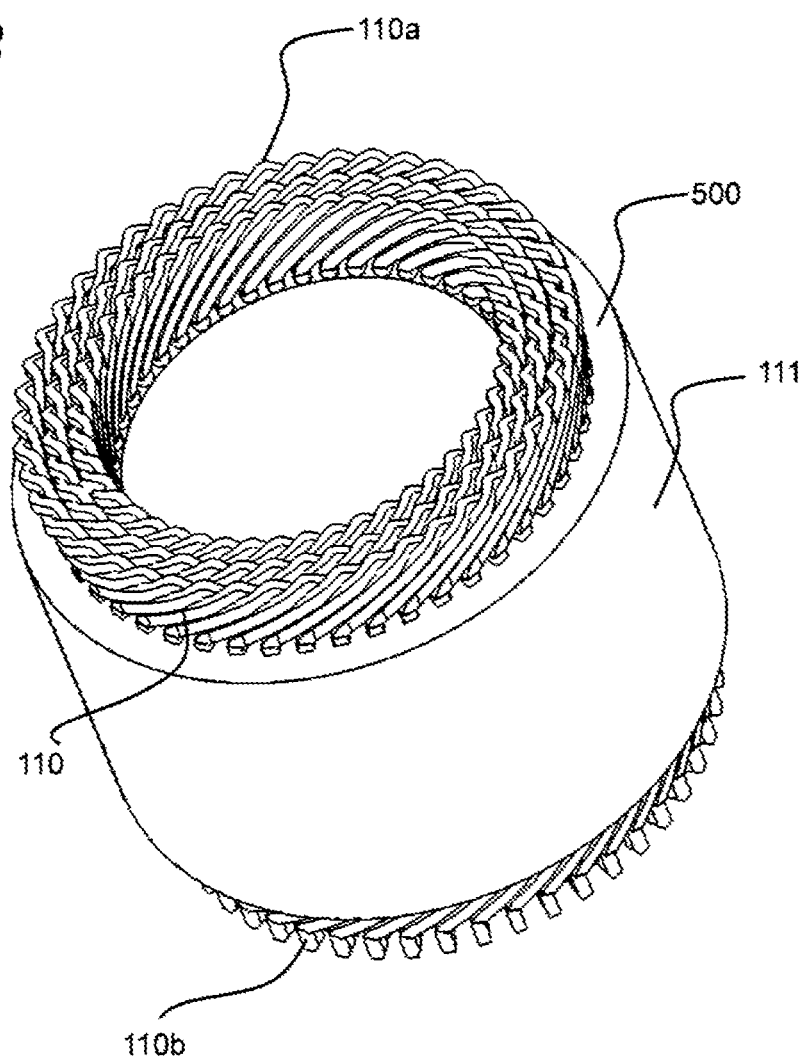
FIG. 3 is a perspective view of a stator.

FIG. 3 is a perspective view of the stator 112. The stator 112 is fixed on the inner peripheral side of the housing 130 and includes the cylindrical stator core 111 and the stator coil 110 attached to this stator core 111. A U-shaped coil end 110a of the plurality of stator coils 110 is formed at one axial end of the stator core 111. On the other hand, a weld side coil end 110b in which welded parts of the stator coils 110 are arranged in a circular shape is formed at an end portion on the opposite side of the stator core 111. The weld side coil end 110b is welded by tungsten inert gas (TIG), for example. In FIG. 3, an output drawing line is not illustrated.

In the stator core 111, the stator core 111 includes laminated electromagnetic steel sheets (for example, silicon steel sheets) 500, and the electromagnetic steel sheets 500 are shaped by punching or etching with a thickness of about 0.05 to 1 mm, and are laminated and then fixed by welding. The electromagnetic steel sheets 500 laminated by this welding are joined to suppress deformation of the electromagnetic steel sheets 500 due to a fastening force at the time of press-fitting into the housing 130.

The stator core 111 is fitted and fixed to the inside of the cylindrical housing 130 by shrink fitting. As a specific assembling method, for example, the stator core 111 is first arranged, and this stator core 111 is fitted with the housing 130 heated in advance and having an inner diameter expanded by thermal expansion. Next, by cooling the housing 130 to contract the inner diameter, the outer peripheral part of the stator core 111 is tightened by the thermal contraction.

The stator core 111 is set such that an inner diameter dimension of the housing 130 becomes smaller than an outer diameter dimension of the stator core 111 by a predetermined value so as to prevent the stator core 111 from idling with respect to the housing 130 due to reaction caused by torque of the stator 112 during operation. As a result, the stator core 111 is firmly fixed in the housing 130 by shrink-fit fitting. The difference between the outer diameter of the stator core 111 and the inner diameter of the housing 130 at room temperature is called a fastening allowance, and by setting this fastening allowance on an assumption of maximum torque of the rotating electric machine 100, the housing 130 can hold the stator core 111 with a predetermined fastening force. The stator core 111 is not limited to the case of fitting and fixing by shrink fitting, and may be fitted and fixed to the housing 130 by press fitting.

[Stator Coil]

Figure 4:
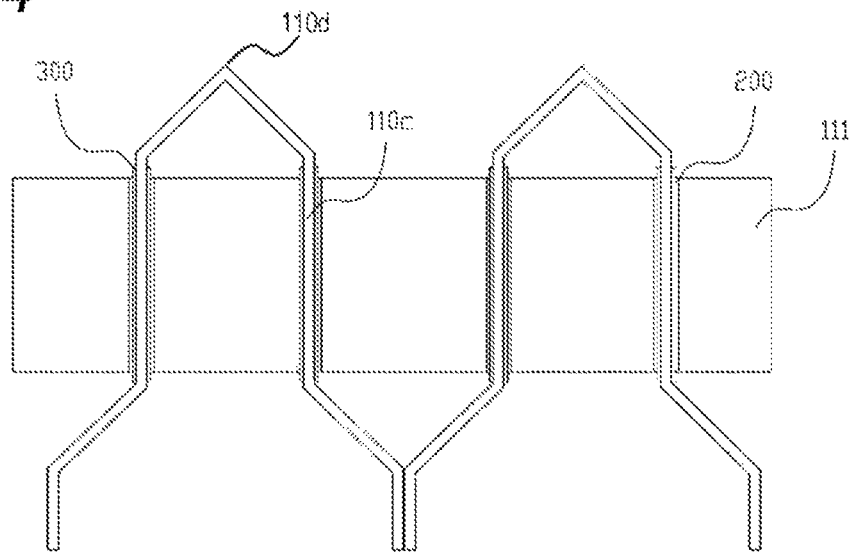
FIG. 4 is a schematic view of a segment of a stator coil illustrated in FIG. 3.

Next, the stator coil 110 will be described. FIG. 4 is a schematic diagram of a segment of the stator coil 110 illustrated in FIG. 3. In the present embodiment, a rectangular wire is used as the stator coil 110, and the stator coil 110 is wound by a distributed winding method. The rectangular wire is provided with a surface coating of polyimide-based, polyester-based, polyesterimide-based, polyamide-imide-based, or the like, but in the present embodiment, the material and surface shape of the coil surface are not limited. The distributed winding is a winding method in which the stator coil 110 is housed in the slots 200 separated across the plurality of slots 200. The present invention is also applicable to the stator 112 having the stator coil 110 of concentrated winding instead of distributed winding.

Figure 7:
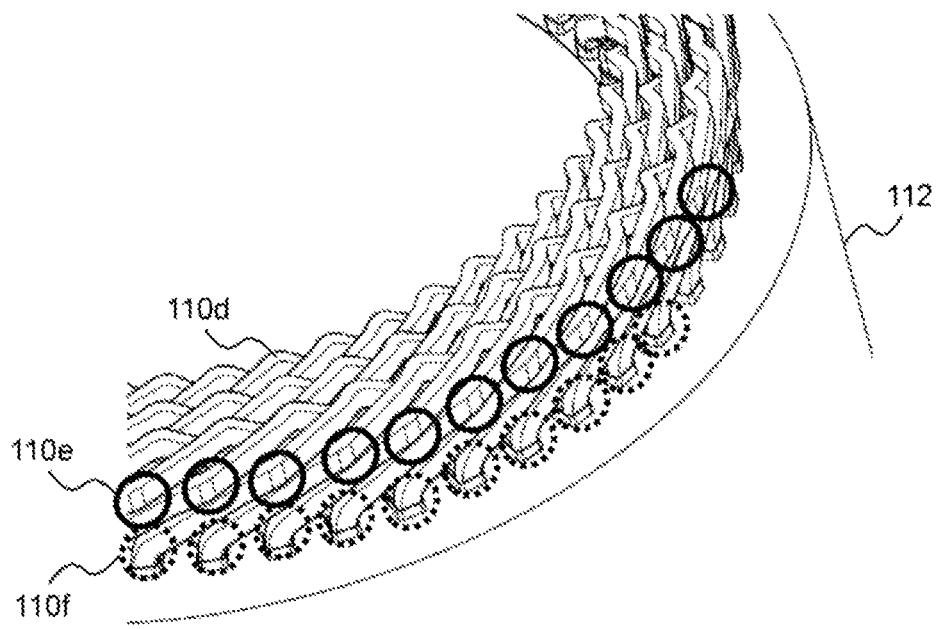
FIG. 7 is a perspective view of a stator applied with varnish.
Figure 8:
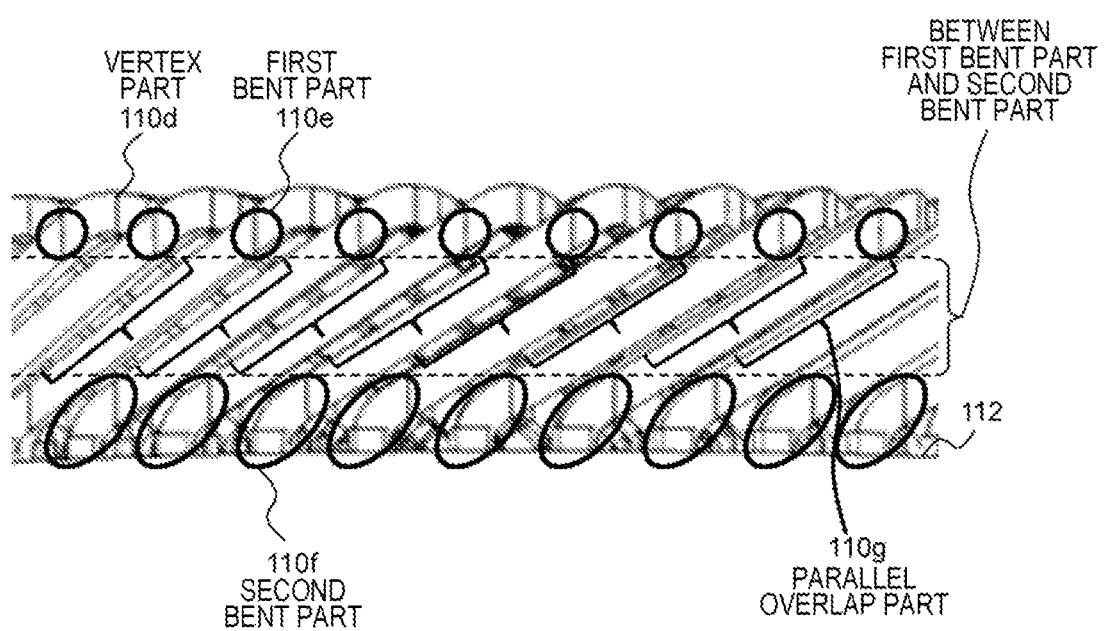
FIG. 8 is a view of a coil end of a stator applied with varnish, viewed from a side.

A rectangular wire having a rectangular cross section is bent in the rotation axis direction at a vertex part 110*d* to be shaped into a U-shape in advance by using foam shaping or the like, the stator coil 110 is inserted in the direction of the slot 200 provided with insulating paper 300, and a linear part of the U-shaped part is inserted into two slots 200 separated from each other across the plurality of slots 200. As illustrated in FIGS. 7 and 8, in the stator coil 110 on the coil end 110*a* side are formed a first bent part 110*e* located close to the vertex part 110*d* of the stator coil 110 shaped in a U shape and immediately above a part (parallel overlap part 110*g*) where the stator coil 110 obliquely extends between the vertex part 110*d* and the stator core 111, and a second bent part 110*f* located close to the stator core 111 and immediately below a part (parallel overlap part 110*g*) where the stator coil 110 obliquely extends between the vertex part 110*d* and the stator core 111.

Thereafter, a linear conductor portion 110*c* protruding to the opposite side in the axial direction of the stator core 111 is torsionally shaped, and the end part thereof is welded to the end part of another stator coil 110 similarly torsionally shaped. In this manner, one phase winding is formed by inserting the plurality of stator coils 110 into the slots 200 of the stator core 111 and connecting them.

The method for shaping the stator coil 110 described above is merely an example, and the stator coil 110 may be shaped in a U shape using a mold, or may be shaped in a U shape after the stator coil 110 is inserted into the slot 200.

The stator coil 110 is fixed to the insulating paper 300 by varnish in the slot 200, and the surface of the coil is protected by the insulating paper 300. The insulating paper 300 is fixed to the stator core 111 with varnish. This prevents a decrease in thickness and breakage due to damage to the surface coating of the insulating paper 300 and the rectangular wire generated by vibration during rotation of the rotating electric machine 100, and prevents a decrease in insulation quality of the rotating electric machine 100. The varnish not only fixes the stator coil 110 and the stator core 111 via the insulating paper 300, but also functions as heat dissipation for inducing heat generated in the stator coil 110 to the stator core 111.

A part of the stator coil 110 protruding from the stator core 111 is fixed to the adjacent stator coil 110 with the varnish to suppress vibration of the stator coil 110 during rotation of the rotating electric machine 100.

The varnish has a liquid property, and examples thereof include polyester-based and epoxy-based, and may be a one-liquid type or a two-mixed-liquid type. The varnish is preferably of a thermosetting type that is solidified by heating, but may be of a cold setting type.

The varnish is preferably applied to both the coil end 110*a* and the weld side coil end 110*b*, but may be applied to only one of the coil ends 110*a* and 110*b*.

[Varnish Process]

Figure 5:
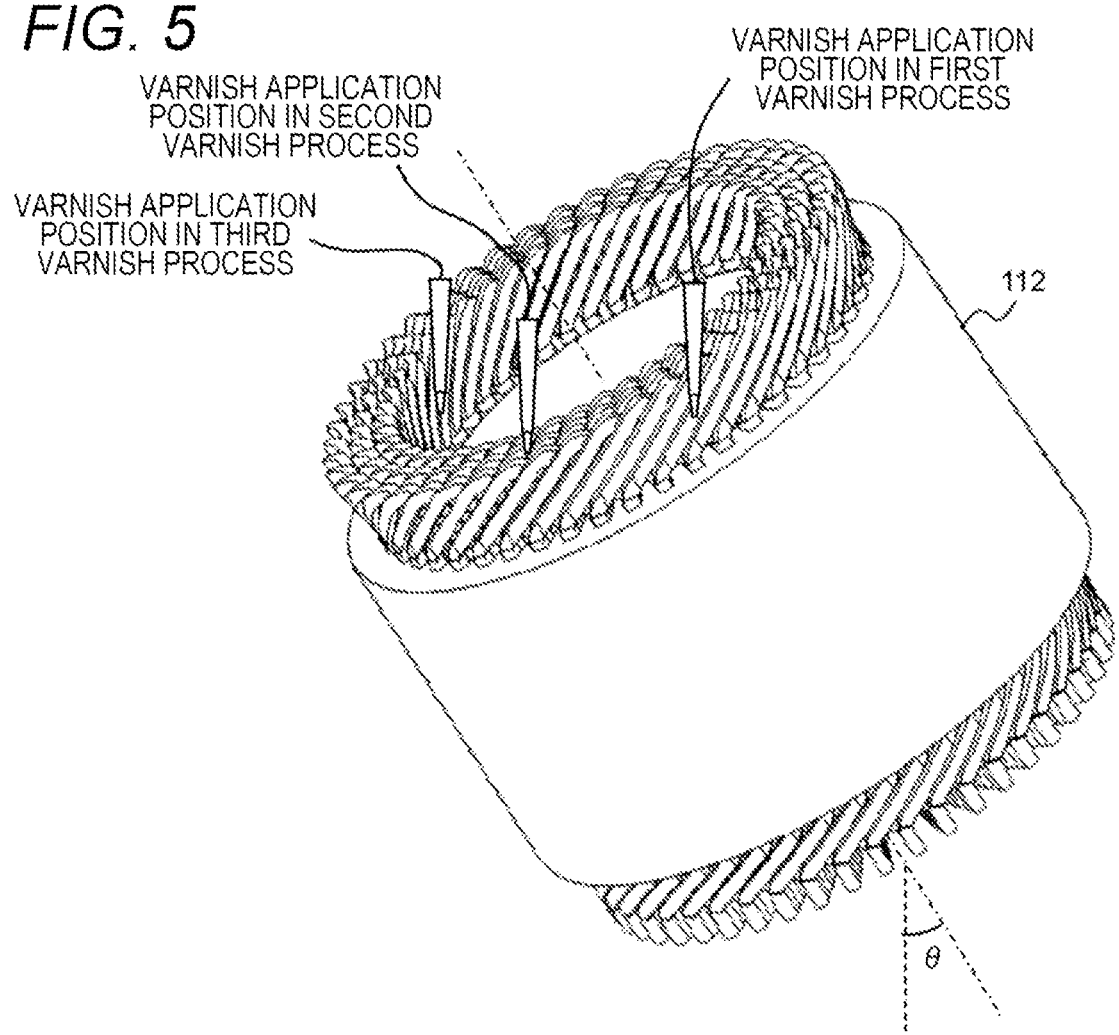
FIG. 5 is a view illustrating a varnish process.

FIG. 5 is a view illustrating a varnish process of the present embodiment, and illustrates a perspective view of the stator 112.

The stator 112 in which the stator coil 110 is inserted into the slot 200 is heated before the varnish is applied. Although the stator 112 may be heated or the varnish may be heated, desirably the varnish is applied after the stator 112 is heated. In the varnish process of the present embodiment, a fixed amount of varnish is dropped to a target position using a dispenser, a liquid phase pump, a spray nozzle, or the like, and the dropped varnish is applied to the stator coil 110. The term "drop" in the present description and claims means that the varnish discharged by an application device drips toward the stator coil 110, and particles of the varnish may drip off discontinuously or drip off continuously. In addition, the size of the particles of the varnish is not limited. The "dropping position" is a position at which the varnish discharged by the coating device comes into first contact with the stator coil 110, and usually, in one stator 112, "drop" is performed a plurality of times while a relative positional relationship between the coating device and the stator coil is changed, and thus, there are a plurality of "dropping positions".

Specifically, the varnish process includes the first varnish process of forming the first varnish portion by applying varnish to a position of stator coil 110 connected to the coil in slot 200, the position being close to stator core 111, and a second varnish process of forming the second varnish portion by applying varnish to a position farther from the stator core 111 (for example, near the vertex part 110*d*) than that in the first varnish process. As a result, a non-existence region where the varnish is not applied is formed between the first varnish portion and the second varnish portion.

In the varnish process, the varnish dripping on the stator coil 110 moves on the surface of the stator coil 110, but at that time, the varnish may come off the stator coil 110 and drip, and the dripping varnish may fall on the stator core 111 and adhere to the adhesion prohibited area of the stator core 111.

For example, on the outer peripheral side of the stator 112, when the varnish adheres to the outer surface of the stator core 111, which is an adhesion prohibited area, the outer diameter of the stator 112 partially increases, and the stator 112 is not attached to the housing 130. On the inner peripheral side of the stator 112, when the varnish adheres to the inner surface of the stator core 111, which is an adhesion prohibited area, the varnish interferes with the rotor 120 attached to the inner side of the stator 112, and the rotor 120 cannot be arranged at a correct position, which causes trouble or failure in rotation. In order to prevent this, by setting the position where the varnish is applied to the stator coil 110 to a position close to the stator core 111, the movement amount of the varnish on the coil surface is reduced, and the risk of the varnish coming off from the stator coil 110 is reduced. Specifically, the first varnish portion is formed by setting the varnish dropping position of the stator coil 110 of the outermost circumference to a position close to the stator core 111, and the second varnish portion is formed by setting the varnish dropping position of the stator coil 110 other than that of the outermost circumference to a position close to the vertex part 110*d* (for example, a part where a slope is formed by the stator coil 110 slightly below the vertex part 110*d*). By setting the varnish dropping position in the first varnish process to a position closer to the stator core 111 than the varnish dropping position in the second varnish process, the first varnish portion is provided at a position closer to the stator core 111 than the second varnish portion. This makes it possible to reduce the movement amount of the varnish, reduce the risk of the varnish coming off from the stator coil 110, and reliably fixing the stator coil 110 with sufficient varnish permeating into the slot 200.

Each varnish process is performed in the order of the first varnish process and the second varnish process. The varnish applied to the stator coil 110 permeates into the core along the stator coil 110. When the varnish drips from the coil of the outermost circumference to the stator core 111, the varnish adheres to the adhesion prohibited area. Therefore, the varnish is applied to the outermost circumference as the first varnish process in a state where the varnish has not permeated the slot 200. By applying the varnish to the outermost circumference in a state where the varnish has not permeated the stator core 111, the permeability of the varnish is better than that in a case of being applied after the varnish is applied to another stator coil 110, and overflow of the varnish from the slot 200 can be prevented, and generation of a defective product can be suppressed.

During the varnish process of the present embodiment, the stator 112 may be disposed with the axis being vertical, but the stator 112 is preferably disposed to be inclined due to accessibility of a dropping device and rotated about the axis. In particular, an inclination θ1 of the stator 112 in the first varnish process is preferably larger than an inclination θ2 of the stator 112 in the second varnish process. The inclination θ of the stator 112 in each varnish process is defined by an angle formed by the axial direction of the stator 112 and the varnish dropping direction (vertical direction), and when the inclination θ=0, the axial direction is vertical and the end face of the stator core 111 becomes horizontal.

In the second varnish process, since the varnish flows down the mesh portion of the stator coil 110, when the stator 112 is inclined to the same extent as in the first varnish process, the varnish hardly permeates into the slot 200, and the varnish does not reach the inside of the stator core 111. Therefore, it is desirable that the inclination of the stator 112 in each varnish process satisfies θ1>θ2.

As illustrated in the drawing, in addition to the first varnish process and the second varnish process, a third varnish process of forming a third varnish portion by applying the varnish to the inner peripheral side of the stator coil 110 at a position closer to the stator core 111 than the second varnish portion to may be provided.

When the applied varnish drips down on the inner peripheral side of the stator coil 110, there is a high risk that the varnish adheres to the stator core 111. Therefore, the varnish is applied to a position close to the stator core 111 on the inner peripheral side of the stator coil 110 so that the varnish does not come off from the stator coil 110 and drip onto the stator core 111 when moving the stator coil 110. Doing this makes it possible to reduce the movement amount of the varnish on the coil surface, reduce the risk of the varnish coming off from the stator coil 110, and reliably fixing the stator coil 110 with sufficient varnish permeating into the slot 200.

In the above description, the varnish is applied to the outer peripheral side in the first varnish process, but the varnish may be applied to the inner peripheral side. That is, when the third varnish process is not included, the varnish is dropped on the inner peripheral side in the first varnish process, and the varnish is dropped near the vertex part 110d in the second varnish process. When the third varnish process is included, the varnish is dropped on the inner peripheral side in the first varnish process, the varnish is dropped near the vertex part 110d in the second varnish process, and the varnish is dropped on the outer peripheral side in the third varnish process.

The varnish process including the third varnish process is preferably performed in the order of the first varnish process, the second varnish process, and the third varnish process, or may be performed in the order of the first varnish process, the third varnish process, and the second varnish process.

[Varnish Applied to Stator]

Figure 6:
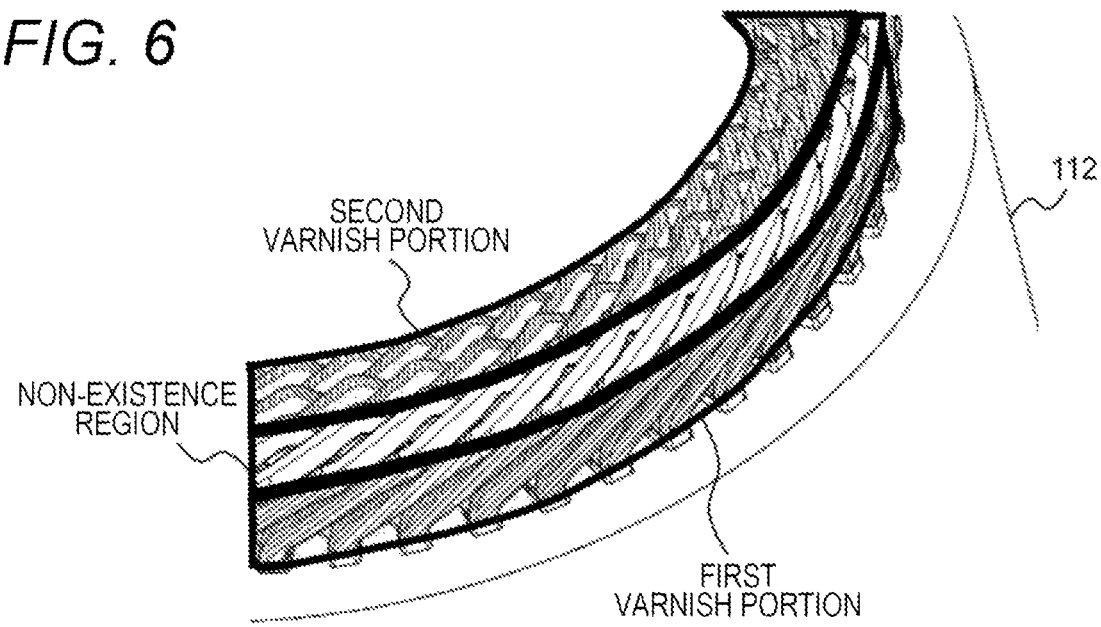
FIG. 6 is a perspective view of a stator applied with varnish.

FIGS. 6 and 7 are perspective views of the stator 112 applied with the varnish of the present embodiment, and FIG. 8 is a view of the coil end 110a of the stator 112 applied with the varnish of the present embodiment.

As illustrated in FIG. 6, the stator coil 110 mounted on the stator 112 is fixed to the stator core 111 by varnish. The part of the stator coil 110 protruding from the end face of the stator core 111 is provided with the first varnish portion to which the varnish adheres in apart of the stator coil 110 close to the stator core 111, the second varnish portion to which the varnish adheres above the first varnish portion, and the non-existence region where the varnish does not adhere between the first varnish portion and the second varnish portion.

As described above, when the varnish adheres to the adhesion prohibited area provided in the stator core 111, a product becomes defective. However, in the stator 112 that is illustrated, the movement distance of the varnish of the outermost peripheral coil on the coil surface is shortened, the varnish can be prevented from dripping, and generation of a defective product can be suppressed.

As illustrated in FIGS. 6, 7, and 8, the non-existence region where the varnish does not adhere is formed between the first bent part 110e and the second bent part 110f. The varnish dropped onto the vertex part 110d sometimes stays in the first bent part 110e of the stator coil 110, and the staying varnish sometimes drips from the first bent part 110e and adheres to the stator core 111. Since the second bent part 110f is close to the stator core 111 and the extension direction is changed by the second bent part 110f such that the stator coil 110 is accommodated in the slot 200, a gap between the stator coils 110 adjacent in the circumferential direction becomes larger on the stator core 111 side than that in the second bent part 110f, and a space is generated. Therefore, when the varnish is dropped on the stator core 111 side relative to the second bent part 110f, the dropped varnish falls into the space between the stator coils 110 and adheres to the adhesion prohibited area of the stator core 111, resulting in a defective product. Therefore, the lower side relative to the second bent part 110f is not appropriate as the varnish dropping position. Therefore, by providing the lower end of the first varnish portion and the upper end of the second varnish portion between the first bent part 110e and the second bent part 110f of the stator coil 110, it is possible to suppress the varnish from staying in the stator coil 110, and possible to reduce the risk that the varnish dripping from the stator coil 110 adheres to the stator core 111.

Since the upper end part of the first varnish portion is provided between the first bent part 110e and the second bent part 110f, it is possible to suppress the varnish flowing along the stator coil 110 from dripping and adhering to the end part of the stator core 111. In the first varnish process, the varnish is applied to a position closer to the stator core 111 than the first bent part 110e (on the lower side in the drawing) and closer to the vertex part 110d than the second bent part 110f (on the upper side in the drawing), that is, between the first bent part 110e and the second bent part 110f. Therefore, the upper end part of the first varnish portion is provided between the first bent part 110e and the second bent part 110f, and it is possible to suppress the dripping varnish from adhering to the end part of the stator core 111.

As illustrated in FIG. 8, the first varnish portion is formed such that the upper end part of the first varnish portion is disposed in the parallel overlap part 110g where adjacent stator coils 110 are arranged to overlap in parallel when the stator 112 is viewed from the direction perpendicular to the axis. In this parallel overlap part 110g, the stator coils 110 are preferably arranged to overlap in parallel with a gap. In the first varnish process, the varnish drops onto the coil of the rotating stator core 111. At this time, since the staying varnish drips at the first bent part 110e, the varnish dropping position is set to a position closer to the stator core 111 than the first bent part 110e. When the adjacent stator coils 110 are separated from each other, the dropped varnish may fall into the gap and adhere to the adhesion prohibited area. Therefore, in the first varnish process, by dropping the varnish is onto the parallel overlap part 110g where the adjacent coils form the parallel gap between the first bent part 110e and the second bent part 110f, the varnish flowing along the stator coil 110 is prevented from dripping and adhering to the stator core 111.

Note that the present invention is not limited to the above-described embodiment, but includes various modifications and equivalent configurations within the scope of the appended claims. For example, the above-described embodiment has been described in detail for the purpose of explaining the present invention in an easy-to-understand manner, and the present invention is not necessarily limited to those including all the configurations described above. The configuration of a certain embodiment may be replaced partly by the configuration of another embodiment. The configuration of another embodiment may be added to the configuration of a certain embodiment.

Another configuration may be added to, deleted from, or substituted for a part of the configuration of each embodiment.

REFERENCE SIGNS LIST 10A, 10B bearing
100 rotating electric machine
110 stator coil
110a, 110b coil end
110c linear conductor portion
110d vertex part
110e first bent part
110f second bent part
110g parallel overlap part
111 stator core
112 stator
120 rotor
121 rotor core
130 housing
140 void
150 permanent magnet
151 magnetic void
160 abutting plate
170 shaft
180 end bracket
190 resolver
200 slot
300 insulating paper
500 electromagnetic steel sheet

The invention claimed is:

1. A method for manufacturing a stator of a rotating electric machine in which a coil is wound around a stator core, the method comprising:
a first varnish process of forming a first varnish portion by dropping varnish at a coil disposed on an outermost circumference or an innermost circumference of a coil end portion where the coil protrudes from the stator core and positioned close to the stator core; and
a second varnish process of forming a second varnish portion to provide a non-existence region where varnish is not applied between the first varnish portion and the second varnish portion by dropping varnish at a position farther from the stator core than a position in the first varnish process;
wherein an angle formed by a varnish dropping direction in the first varnish process and an axis of the stator is larger than an angle formed by a varnish dropping direction in the second varnish process and the axis of the stator.

2. The method for manufacturing a stator of a rotating electric machine according to claim 1, wherein the second varnish process is performed after the first varnish process.

3. A stator of a rotating electric machine, comprising:
a stator core formed with a plurality of slots; and
a coil arranged side by side in a radial direction and housed in the slot,
wherein the coil includes
a first varnish portion formed by dropping varnish at a position close to the stator core of a coil disposed on an outermost circumference or an innermost circumference of a coil end portion protruding from the slot,
a second varnish portion formed by dropping varnish at a position far from the stator core, and
a non-existence region where varnish is not applied between the first varnish portion and the second varnish portion;
wherein
the coil includes a vertex part bent in a rotation axis direction, a first bent part located close to the vertex part and immediately above a part where the coil obliquely extends, and
a second bent part located immediately below a part where the coil obliquely extends after protruding from the stator core, and
the first bent part is provided in the non-existence region.

4. The stator of a rotating electric machine according to claim 3, wherein when viewed from a direction perpendicular to an axial direction, an upper end of the first varnish portion includes the coils adjacent to each other are arranged to overlap each other in parallel.

5. A rotating electric machine comprising the stator according to claim 3.

6. A method for manufacturing a stator of a rotating electric machine in which a coil is wound around a stator core, the method comprising:
a first varnish process of forming a first varnish portion by dropping varnish at a coil disposed on an outermost circumference or an innermost circumference of a coil end portion where the coil protrudes from the stator core and positioned close to the stator core;
a second varnish process of forming a second varnish portion to provide a non-existence region where varnish is not applied between the first varnish portion and the second varnish portion by dropping varnish at a position farther from the stator core than a position in the first varnish process; and a third varnish process of forming a third varnish portion by dropping varnish at a position closer to the stator core than the second varnish portion in a coil disposed on an outermost circumference or an innermost circumference of the coil end portion where the first varnish portion is not provided.

7. The method for manufacturing a stator of a rotating electric machine according to claim 6, wherein the second varnish process is performed after the first varnish process.

8. A method for manufacturing a stator of a rotating electric machine in which a coil is wound around a stator core, the method comprising:
a first varnish process of forming a first varnish portion by dropping varnish at a coil disposed on an outermost circumference or an innermost circumference of a coil end portion where the coil protrudes from the stator core and positioned close to the stator core; and
a second varnish process of forming a second varnish portion to provide a non-existence region where varnish is not applied between the first varnish portion and the second varnish portion by dropping varnish at a position farther from the stator core than a position in the first varnish process;
wherein
the coil includes a vertex part bent in a rotation axis direction, a first bent part located close to the vertex part and immediately above a part where the coil obliquely extends, and
a second bent part located immediately below a part where the coil obliquely extends after protruding from the stator core, and
in the first varnish process, varnish is dropped such that an upper end of the first varnish portion is provided between the first bent part and the second bent part.

9. The method for manufacturing a stator of a rotating electric machine according to claim 8, wherein the second varnish process is performed after the first varnish process.

10. The method for manufacturing a stator of a rotating electric machine according to claim 8, wherein in the first varnish process, varnish is dropped such that the upper end of the first varnish portion is located at a position where the coils adjacent to each other are arranged to overlap each other in parallel when viewed from a direction perpendicular to an axial direction.

11. A stator of a rotating electric machine, comprising:
a stator core formed with a plurality of slots; and
a coil arranged side by side in a radial direction and housed in the slot,
wherein the coil includes
a first varnish portion formed by dropping varnish at a position close to the stator core of a coil disposed on an outermost circumference or an innermost circumference of a coil end portion protruding from the slot,
a second varnish portion formed by dropping varnish at a position far from the stator core, and
a non-existence region where varnish is not applied between the first varnish portion and the second varnish portion;
wherein the coil includes a third varnish portion formed by dropping varnish at a position closer to the stator core than the second varnish portion of a coil disposed on an outermost circumference or an innermost circumference of the coil end portion where the first varnish portion is not provided.

12. The stator of a rotating electric machine according to claim 11, wherein when viewed from a direction perpendicular to an axial direction, an upper end of the first varnish portion includes the coils adjacent to each other are arranged to overlap each other in parallel.

13. A rotating electric machine comprising the stator according to claim 11.

14. A stator of a rotating electric machine, comprising:
a stator core formed with a plurality of slots; and
a coil arranged side by side in a radial direction and housed in the slot,
wherein the coil includes
a first varnish portion formed by dropping varnish at a position close to the stator core of a coil disposed on an outermost circumference or an innermost circumference of a coil end portion protruding from the slot,
a second varnish portion formed by dropping varnish at a position far from the stator core, and
a non-existence region where varnish is not applied between the first varnish portion and the second varnish portion;
wherein
the coil includes a vertex part bent in a rotation axis direction, a first bent part located close to the vertex part and immediately above a part where the coil obliquely extends,
a second bent part located immediately below a part where the coil obliquely extends after protruding from the stator core, and
an upper end of the first varnish portion is located between the first bent part and the second bent part.

15. The stator of a rotating electric machine according to claim 14, wherein when viewed from a direction perpendicular to an axial direction, an upper end of the first varnish portion includes the coils adjacent to each other are arranged to overlap each other in parallel.

16. A rotating electric machine comprising the stator according to claim 14.

* * * * *